Nov. 4, 1952  S. GOLDENBERG  2,616,751
BOTTLE HOLDER AND CARRIER
Filed June 21, 1947
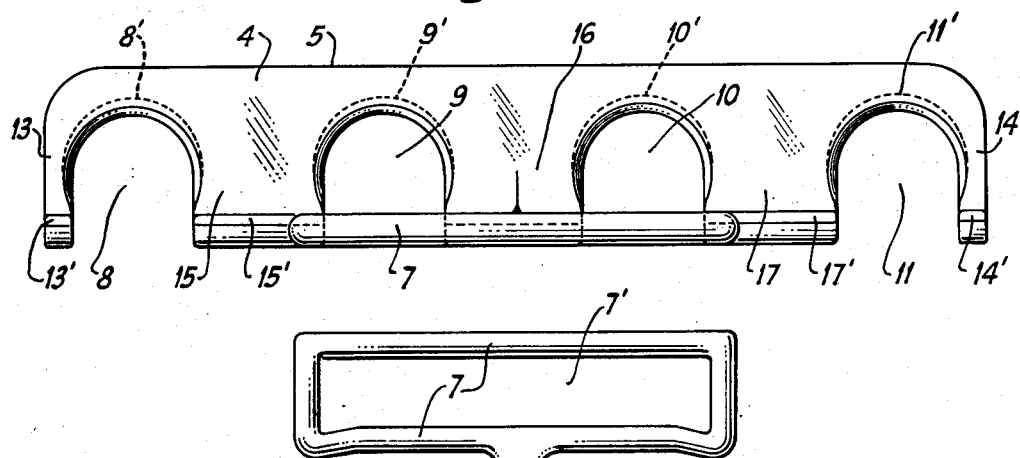
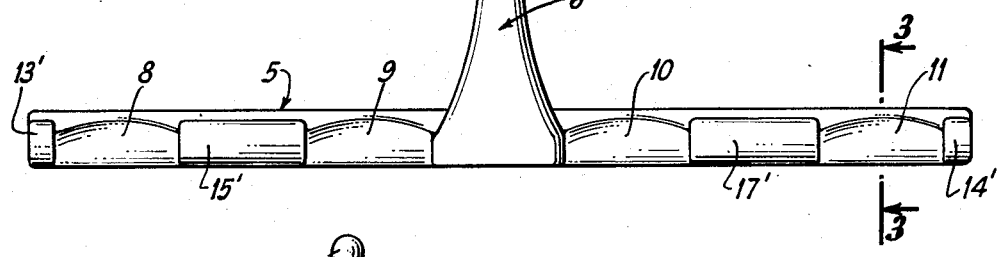
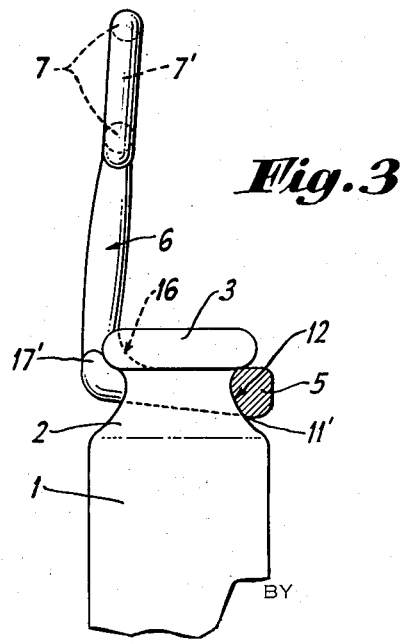
INVENTOR.
SEYMOUR GOLDENBERG
BY Abraham S. Greenberg
ATTORNEY Patented Nov. 4, 1952

2,616,751

UNITED STATES PATENT OFFICE 2,616,751

BOTTLE HOLDER AND CARRIER

Seymour Goldenberg, Grantwood, N. J.

Application June 21, 1947, Serial No. 756,177

2 Claims. (Cl. 294—87.28)

My present invention relates in general to bottle holders, and more particularly to a hand carrier and holder for bottles.

In the past there have been proposed bottle holders of the hand carrier type, but these have been generally unsuitable for the delivery or collection of milk bottles. Especially is this true where the milk bottle is of the squat type having a square cross-sectional body and a short conical neck. In accordance with my present invention I have improved a plural bottle holder of the hand carrier type in three important respects. My improved carrier has a thickened back section to impart improved balance and weight to the holder; there is a rearward slope on each bottle neck notch or way for preventing clinking of bottles and for firmly locking each neck; and an improved generally T-shaped handle projects from a median point of the front section of the holder.

It is an important object of my invention to provide a plural bottle holder and carrier provided with the aforesaid improvements thereby to enable milk bottle delivery men to speed up the collection of empty bottles and delivery of full bottles.

Further objects of my invention are to provide a holder, especially adapted for milk bottles, which is economical and simple to manufacture, is completely foolproof and reliable in its functioning, and occupies a minimum of space.

These and other objects are attained by the means about to be described herein and shown in the accompanying drawing, in which:

Fig. 1 is a view in plan illustrating an embodiment of my improved bottle holder and carrier;

Fig. 2 is a front view looking into the respective ways or notches; and

Fig. 3 is a sectional view taken along line 3—3 of Fig. 2 looking in the direction of the arrows, a milk bottle being shown positioned in the end notch.

Referring now to the accompanying drawing, wherein like reference numerals in the several figures denote similar elements, the bottle holder and carrier shown is preferably a single integral device made of a light metal such as aluminum. The holder is readily cast, since its construction is such as to permit a casting operation. However, I do not restrict myself to a metallic composition, since plastics or even wood may be utilized in the fabrication of the present device. I wish to point out that while the present device is described specifically for milk bottles, it can be used with suitable modification for all types of bottles. It, also, can be sold in reduced size as a toy or plaything for children.

Before giving a detailed description of the present holder, it is pointed out that recent changes in milk bottle construction have made it difficult to carry the milk bottle at the neck. Whereas in the past the milk bottle of glass construction used in the East generally had a long easily-grasped neck, at the present time the quart milk bottle in this same section of the country generally is squat, has a body with a square cross-section and a short conical neck. Fig. 3 shows a representation of a quart glass milk bottle whose body 1 has a short tapered neck 2 with a bead 3. The problem is to handle such difficult bottles with minimum time of pick-up or delivery and no breakage. The average milk delivery man works under the pressure of completing a route which must be completely covered in a given period of time. With my present holder and carrier there is possible the saving of a full two hours of such a seven hour delivery period.

In using my present holder the delivery man may carry as many as sixteen bottles at one time. This is readily accomplished, because of the unique construction which permits a pair of holders to be carried in each hand. One pair can be used for empty bottles while the other pair is used for full bottles. These functions and advantages all arise from the fact that the holder is essentially an elongated rectangular rack or panel 4 provided with an unbroken back or rear section 5, while the front section is provided with a median vertical handle 6 which is generally of a T shape.

The panel 4 preferably is thickened at its rear unbroken section 5. That is to say, the panel or rack has a predetermined slope from its upper rear edge to its front edge along the upper face of the rack. The thickening of the rear section gives the entire rack more weight and balance relative to the vertical handle 6. As shown in Fig. 3, the thickened rear section 5 is heavier than the forward section to which the handle is attached and causes the plane of the rack 4 to be somewhat tilted forwardly when the fingers hold the lateral portion 7 of the handle in a vertical position. This deliberate weighting of the rear section of the holder insures positive positioning of the necks 2 of the bottles in the respective U-shaped ways or notches 8, 9 10 and 11 of the holder.

As clearly shown in Fig. 1, each neck way or notch is substantially a U, and has its wall thinner at its entrant ends than at its rear section. This is depicted in Fig. 3, which further shows that the rear section of the notch wall has a rearward slope from the upper face of rack 1 to its lower face. In Fig. 1 the respective dotted lines 8' to 11' indicate the lower edges of the notches 8 to 11.

The notches are of equal sizes, and there may be three or four on either side of vertical handle 6 if desired. The notches are designed to be sufficiently large to receive a bottle neck 2, the bead 3 of each bottle overhanging the peripheral zone of each notch as shown in Fig. 3. The notches are given a rearward slope at the rear portions thereof so as snugly to conform to the tapered neck 2 adjacent bead 3. Fig. 3 illustrates the manner in which the rearward slope 12 of notch 11 conforms to the neck taper. In this way the bottles are prevented from clinking, and moreover the necks are locked in position.

It will be noted that each notch is deep, and extends quite close to the rear edge of the rack. The end walls 13 and 14 are narrow, while the front ends 13' and 14' thereof are upturned to provide stops for the bottle beads 3. The intermediate solid sections 15, 16 and 17 are about as wide as the notches themselves. The front edges 15' and 17' of sections 15 and 17 respectively are upturned as in the case of edges 13' and 14'. The edges 13', 15', 17' and 14' are in alignment, as shown in Fig. 1. They serve to provide stops to prevent accidental slippage of the bottles from the notches. If desired, however, all the upturned edges may be omitted, because the weighted rear section 5 provides sufficient uplift of the entrant portions of the notches to prevent slippage.

The central or median solid section 16 has a vertical handle extension 6. The handle extension 6 projects at approximately ninety degrees from the plane of section 16 along a line in alignment with edges 13' to 14'. The base of handle 6 tapers upwardly to the wide lateral gripping section 7. The section 7 is preferably given a length such that it overlaps the entrant sections of notches 9 and 10. The lateral opening 7' of the gripping section 7 is provided for the fingers. I have found that superior leverage is provided by the wide gripping section 7. The opposite corners of the lower edge of the handle, as shown, project somewhat to provide a good grip. The wide gripping means is provided at the central section of the holder along a vertical line projecting up from the front edge of the rack.

In usage a person grasps the handle, either in the opening 7' or along the lower edge, and positions the necks of four bottles in the respective notches 8 to 11. It will be appreciated that the bottles can be swept up by using the device as a claw. For example, a set of four bottles can be "hooked" out of a box containing the filled milk bottles. This by itself is a decided advantage to the milk delivery man, since it aids him in cutting down the time of delivery per person. It will, again, be appreciated that due to the improved leverage provided by the handle 6 the entire rack may be manipulated in the manner of a claw even though the notches be fully loaded with bottles. By placing a pair of holders in opposed relation, that is with the handles 6 in contact, it is possible to carry a pair of holders in each hand whereby a delivery man may carry as many as sixteen bottles at one time. It is emphasized that besides having perfect balance, the heavier back section provides an inherent means for keeping the bottles positioned, whereas the rearward slopes 12 lock the necks of the bottles. By a slight pressure of fingers between upper and lower edges of handle the rack is readily given a tilt such as to keep the bottle necks positively positioned in the respective ways.

One of the advantages of my device is that the delivery man need not touch either the full or empty bottles at the customer's door. With a carrier in each hand he can readily pick up empty bottles out of the customer's box with one holder, while depositing the full bottles in the box from the other carrier.

My invention is capable of modification in other respects than is disclosed herein, and I reserve the right to all modifications falling within the scope of my present invention.

What I claim is:

1. A bottle holder and carrier comprising a generally rectangular elongated horizontal rack whose length is appreciably greater than its width and having a plurality of generally U-shaped notches along its length and solely on one side thereof, said one side defining the front edge of said carrier, the opposed side of said rack along the length thereof being straight and defining the rear edge of said carrier, said notches constituting openings extending into said carrier for the major portion but appreciably less than the total width of the rack, the entire portions of said rack between said notches and also the rear of said rack being integral, a T-shaped median vertical handle fixedly secured to the front edge of said rack and integral therewith, the rear edge of said rack being thicker than the frontal edge and gradually tapering in diminishing thickness toward said front edge, whereby the rear portion of the rack is deliberately weighted.

2. A bottle holder and carrier in accordance with claim 1, wherein said U-shaped notches have walls of tapering thickness which are thinner on the inside portion of the U than at a distance in the rear or to either side of the U, said inside portion being adapted to contact the bottles to be carried.

SEYMOUR GOLDENBERG.

REFERENCES CITED

The following references are of record in the file of this patent:

UNITED STATES PATENTS

| Number | Name | Date |
|---|---|---|
| 2,067,124 | Hoffman | Jan. 5, 1937 |
| 2,264,903 | Kruea | Dec. 2, 1941 |
| 2,276,756 | Agrillo | Mar. 17, 1942 |
| 2,301,594 | Voigtritter | Nov. 10, 1942 |
| 2,440,902 | Lutey | May 4, 1948 |
| 2,447,934 | Doppelheuer | Aug. 24, 1948 |